(12) United States Patent
Frei et al.

(10) Patent No.: US 8,457,094 B2
(45) Date of Patent: Jun. 4, 2013

(54) MINI-SLOT COMMUNICATION PROTOCOL

(75) Inventors: Randy Frei, San Jose, CA (US); Paul Gordon, Santa Clara, CA (US); James R. Huston, Boulder Creek, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 316 days.

(21) Appl. No.: 12/912,255

(22) Filed: Oct. 26, 2010

(65) Prior Publication Data

US 2011/0038315 A1    Feb. 17, 2011

Related U.S. Application Data

(63) Continuation of application No. 10/641,877, filed on Aug. 15, 2003, now Pat. No. 7,822,008.

(51) Int. Cl.
*H04J 3/00* (2006.01)
(52) U.S. Cl.
USPC .......................................... 370/345; 370/328
(58) Field of Classification Search
USPC ........................................................ 370/345
See application file for complete search history.

(56) References Cited

U.S. PATENT DOCUMENTS

| | | | |
|---|---|---|---|
| 5,502,722 A | 3/1996 | Fulghum | |
| 5,577,043 A | 11/1996 | Guo et al. | |
| 6,018,659 A | 1/2000 | Ayyagari et al. | |
| 6,252,884 B1 | 6/2001 | Hunter | |
| 6,356,537 B1 | 3/2002 | Jaakkola et al. | |
| 6,560,211 B2 | 5/2003 | Esteves et al. | |
| 6,757,532 B1 * | 6/2004 | Haartsen | 455/414.1 |
| 6,898,445 B2 | 5/2005 | Slettengren et al. | |
| 6,901,275 B1 * | 5/2005 | Aoyagi | 455/574 |
| 7,042,863 B1 | 5/2006 | Morris | |
| 7,149,183 B2 | 12/2006 | Hammel et al. | |
| 2002/0071413 A1 | 6/2002 | Choi | |
| 2002/0082060 A1 * | 6/2002 | Kang et al. | 455/574 |
| 2002/0086687 A1 | 7/2002 | Kockmann et al. | |
| 2002/0101849 A1 | 8/2002 | Kang et al. | |
| 2002/0141479 A1 | 10/2002 | Garcia-Luna-Aceves et al. | |
| 2002/0154622 A1 | 10/2002 | Hammel et al. | |
| 2002/0167961 A1 | 11/2002 | Haarsten | |
| 2002/0181427 A1 | 12/2002 | Sparr et al. | |
| 2003/0231607 A1 | 12/2003 | Scanlon et al. | |
| 2004/0085981 A1 | 5/2004 | Lee et al. | |
| 2004/0100929 A1 | 5/2004 | Garcia-Luna-Aceves | |
| 2005/0041613 A1 | 2/2005 | Kuhl et al. | |
| 2006/0203796 A1 * | 9/2006 | Morris | 370/346 |

OTHER PUBLICATIONS

Preliminary Report on Patentability dated Mar. 2, 2006 for PCT Application No. PCT/US2004/026107.

(Continued)

*Primary Examiner* — Brandon Renner
*Assistant Examiner* — Shaq Taha
(74) *Attorney, Agent, or Firm* — Moser Taboada

(57) ABSTRACT

Mesh communications based on a plurality of time-slots in which every time slot is associated with communications between a pair of nodes, in which at least one time-slot is associated with communications between a first node and a second node, and in which at least a second time-slot is associated with communications between the first node and a third node. The first node and the second node communicate during the at least one time-slot, while the third node awaits communications with the first node during the second time-slot. If the first node is still communicating with the second node during the second time-slot the first node does not communication with the third node.

16 Claims, 6 Drawing Sheets

OTHER PUBLICATIONS

Kalia M., et al., "Data Scheduling and SAR for Bluetooth MAC", VTC 2000-Spring, 2000-IEEE 51st Vehicular Technology Conference Proceedings, Tokyo, Japan, May 15-18, 2000, IEEE Vehicular Technology Conference, New York, NY, pp. 716-720.

* cited by examiner

MINI-SLOT COMMUNICATION PROTOCOL

CROSS-REFERENCE TO RELATED APPLICATIONS

This application is a continuation of co-pending U.S. patent application Ser. No. 10/641,877, filed Aug. 15, 2003. The aforementioned related patent application is herein incorporated in its entirety by reference.

BACKGROUND OF THE INVENTION

1. Field of the Invention

This invention generally relates to data network communication networks and to their communication protocols. More particularly, this invention relates to a mesh network and its communication protocol that uses pre-assigned mini-slots for initiating communications between a master node and its slave nodes.

2. Description of the Related Art

The appetite for information continues to fuel the growth of the Internet. Because of such growth, new information is constantly being added, which fuels even more growth. Such growth has caused bandwidth problems in many areas. Indeed, yesteryear's limited bandwidth telephone dial-up services are rapidly being replaced with broad bandwidth systems such as digital subscriber lines (DSL) and cable modems. Unfortunately, such systems are not available to a significant portion of the population. Moreover, the acquisition and installation costs associated with such systems make them unappealing to some users and to some service providers.

An alternative to wired communication systems is wireless communications. Wireless communication systems can be deployed very rapidly and at less cost than its wired counterparts. For example, wireless data communication systems that use cellular phone technologies are becoming commonplace, primarily because they provide mobile Internet connectivity. Unfortunately, most cellular phone data systems tend to be severely bandwidth limited.

A wireless communication system that can provide a bandwidth comparable to DSL and cable modem technologies, but that is less difficult and costly to install, is a wireless mesh network. Such a mesh network comprises a plurality of wirelessly connected nodes that communicate information traffic across a wide area. The individual nodes of the mesh network communicate using radio or microwave signals to pass information between the mesh nodes. Mesh networks generally use a form of time division multiplex (TDM) signaling to propagate data. Each node is assigned a time slot within which to send or receive data from a neighboring node. If a node is not sending or receiving data when its time slot is available that slot goes unused. As such, a TDM technique can be bandwidth inefficient. Additionally, if a node must communicate a large amount of data, the data is spread over many time slots, which slows the transmission speed of the entire set of data.

Therefore, there is a need for a mesh network communication protocol that readily handles data traffic between nodes.

SUMMARY OF THE INVENTION

The present invention provides for a mesh network and for a mesh network communication protocol that is based on a plurality of time-slots. Each time slot is associated with communications between a pair of nodes, at least one time-slot is associated with communications between a first node and a second node, and at least a second time-slot is associated with communications between the first node and a third node. The first node and the second node communicate during the at least one time-slot, while the third node awaits communications with the first node during the second time-slot. If the first node is still communicating with the second node during the second time-slot the first node does not communication with the third node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates an operational flow sequence of a master node and of a slave node; and.

DETAILED DESCRIPTION

The present invention provides for a mesh network that implements a communication protocol that enables data sharing between neighboring nodes of the mesh network. Within a group of neighboring nodes, one node is a master node that controls communication flow to and from other nodes (slave nodes). A slave node in one group may be a master node within another group. Slave nodes of a master node are mesh nodes that directly communicate with the master node. The master node may transmit to an individual slave node or polls its individual slave nodes to receive data, with polling being initiated by signaling a selected slave node during a short time period, referred to herein as a mini-slot, that is assigned to that selected slave node.

In practice, mini-slots are formed by dividing a communication time frame into a plurality of short time periods, at least some of which are assigned to particular slave nodes. Based on information passed between the master node and the selected slave node, data is either passed immediately from the master to the slave and/or, after polling is initiated, from the slave to the master. Communication between a master node and a slave node may occur over a plurality of mini-slots. During those periods the other slave nodes will not be polled.

It should clearly be understood that while the principles of the present invention are highly useful in wireless mesh networks, that those principles are also useful in wired mesh networks, or in any form of network having nodes that communicate in a master-slave relationship.

Figure 1:
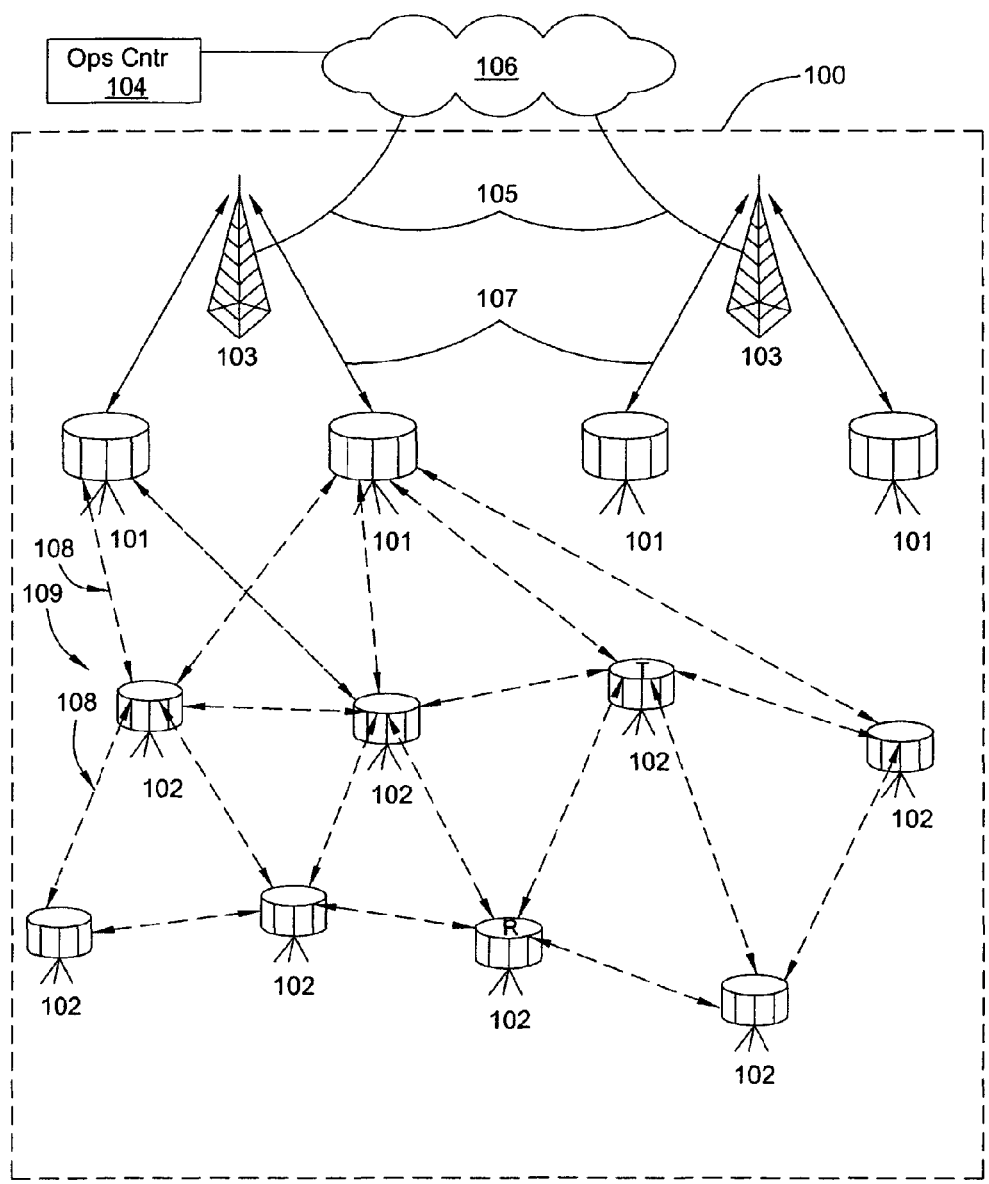
FIG. 1 is a network diagram depicting a mesh network in accordance with the present invention.

FIG. 1 illustrates a mesh network 100 that is in accord with the principles of the present invention. Similar networks are described in U.S. patent application Ser. No. 10/122,886, filed Apr. 15, 2002 and in U.S. patent application Ser. No.

10/122,762, filed Apr. 15, 2002. The mesh network 100 includes one or more Mesh Gateways 103, a plurality of network access points (NAPs) 101, and a plurality of network nodes 102. Internet traffic from a network node 102 is routed to a NAP 101, or from one network node 102 to another until such traffic is routed to its intended destination. Notably, the Mesh Gateways 103, the NAPs 101, and the network nodes 102 communicate with one another to form the mesh network 100.

Figure 4:
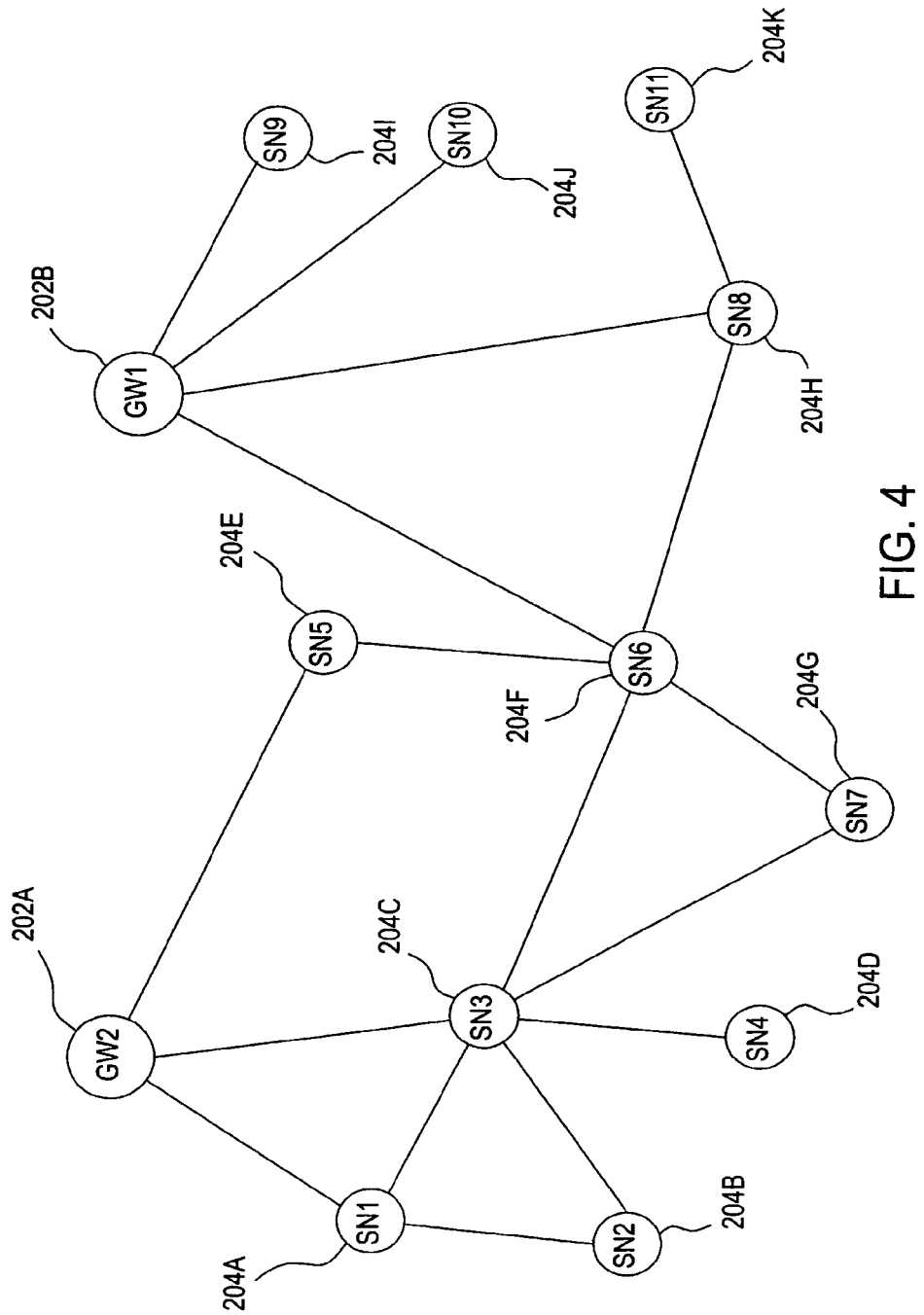
FIG. 4 schematically illustrates a simplified mesh network architecture.

With reference to FIGS. 1 and 4, in the descriptions that follow the mesh gateways 103 will also be referred to as master nodes (shown as nodes 202A and 202B in FIG. 4), while various network access points 101 and network nodes 102 will also be referred to as slave nodes (shown as slave nodes 204A through 204K in FIG. 4). The purpose of doing this is to include all mesh nodes in the overall description of the mesh network 100 while subsequently isolating selected nodes to clearly explain their inter-node communication protocols. This duality comports with practical aspects of mesh networks: the physical mesh network itself, and the communication protocols used to establish communications into, within, and from the mesh network. Of course the physical mesh network and its communication protocol are not independent of one another. It also should be understood that the mesh network 100, implements a multi-layered family of communication protocols. This is similar to what is done in the IEEE 802.11 family of protocols. In particular, the mesh network 100 implements protocols to set up the mesh network 100 itself, to add, remove, and identify network nodes 102, to handle issues such as conflicts between mesh gateways/master nodes that communicate with the same slave node, to establish time frames, to handle signal routing functions, to deal with system faults, and to interface with CPE nodes and with the internet. Thus it should be understood that the present invention relates to data communications between master nodes and slave nodes in an established, intact, and functioning mesh network 100.

Turning now to FIG. 1, the Mesh Gateways 103 are coupled to one or more backhauls 105 that are coupled to a network 106, which may be coupled to an operations center (OC) 104. The network 106 may comprise a portion of the Internet or a private network.

The NAPs 101 can communicate with the Mesh Gateways 103, with the network 106 via backhaul communication links 107, and/or with nearby network nodes 102. It should be understood that backhauls may be wired or wireless. In an embodiment, wireless point-to-point communication between a Mesh Gateways 103 and a NAP 101 is via the Unlicensed National Information Infrastructure (UNII) band. However, other bands may be used. At locations where wired connectivity is available, wired connectivity may be used. In particular, it should be clearly understood that the present invention is not restricted to wireless point-to-point systems. Indeed, the principles of the present invention are as pertinent to wired systems as to wireless systems. However, for simplicity, and without loss of generality, the present invention will be described with reference to a wireless communication system.

Each network node 102 is in wireless communication with at least one NAP 101 or with another network node 102. Thus, the network nodes 102 form, at least in part, a wireless Wide Area Network (WAN) using wireless interlinks 108.

Figure 2:
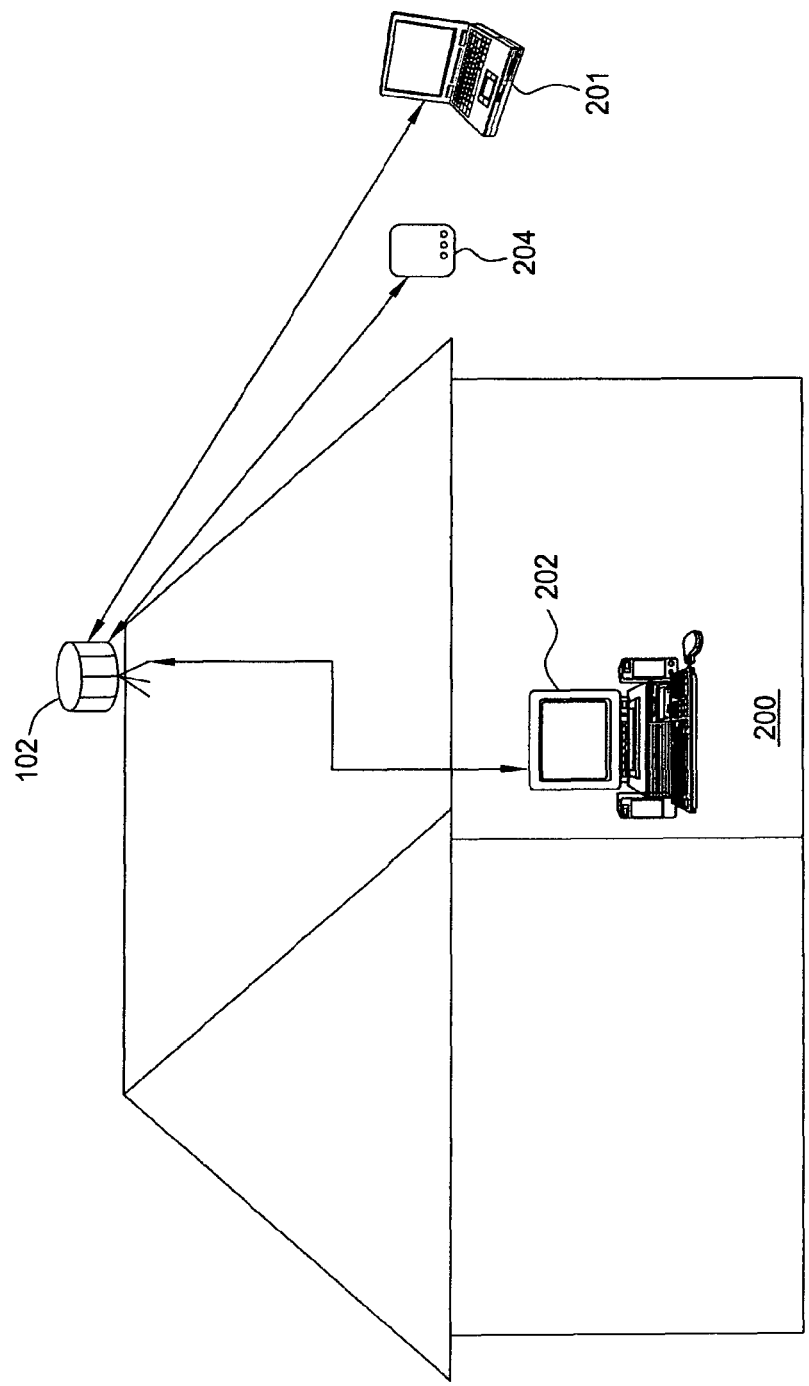
FIG. 2 is a diagram of a consumer location (a house) having consumer premises equipment (CPE) that forms part of a node in the mesh network.

Referring now to FIG. 2, a network node 102 may be physically located on a roof-top of a house 200, in a window, in an attic, on a telephone pole, and the like. The house 200 may have any of a variety of networked CPE devices such as computers, printers, set-top boxes, PDAs, and like devices. For purposes of illustration, a computer 202, a notebook computer 201, and a PDA 204 are shown electronically connected to a network node 102 using wireless connectivity such as a wireless local area network (WLAN).

Figure 3:
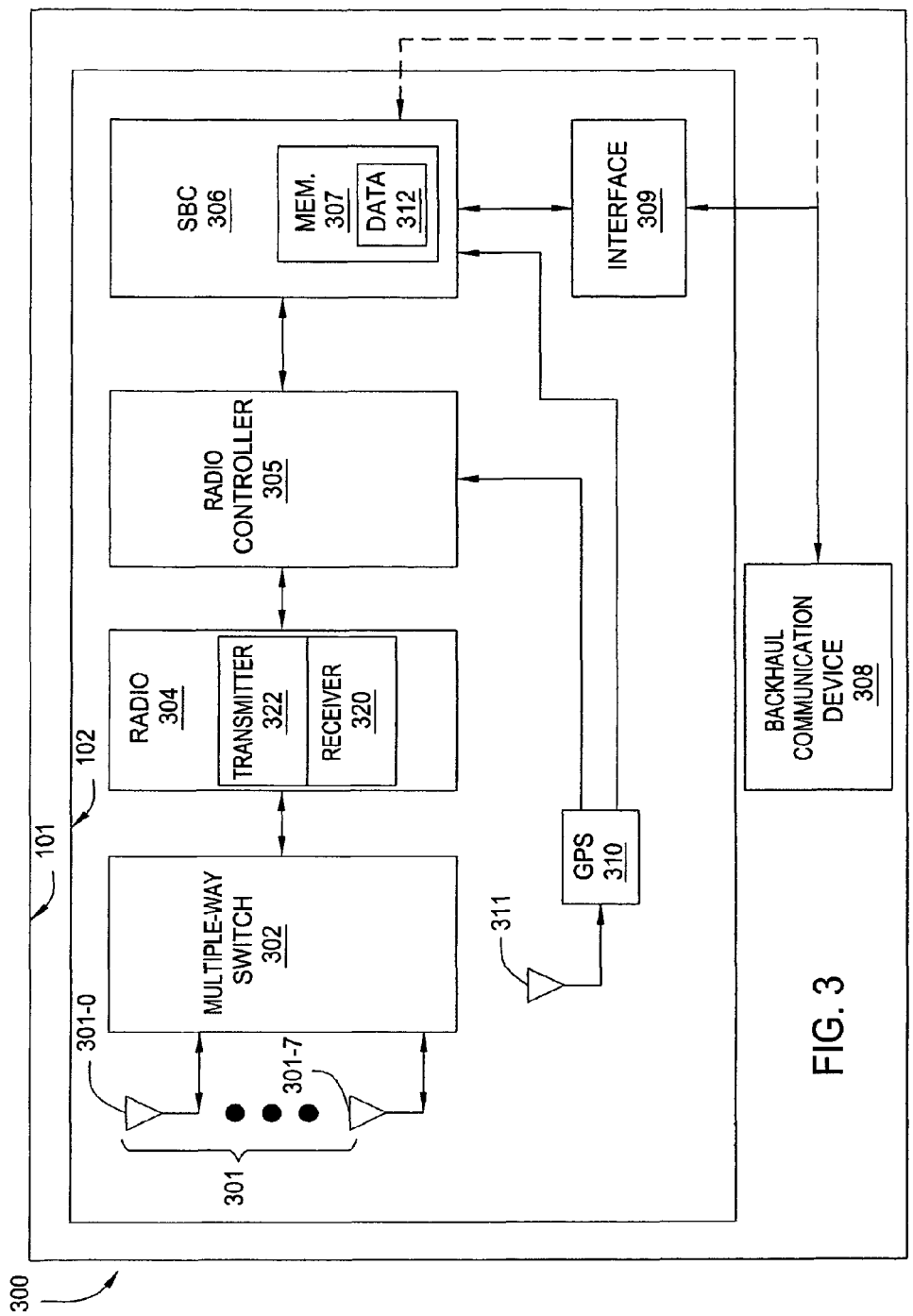
FIG. 3 is a schematic block diagram of an exemplary node.

Referring now to FIG. 3, there is shown a schematic block diagram of an exemplary node 300. The node 300 might be a Mesh Gateway 103, a NAP 101, or a network node 102. Each node 300 includes a multi-sectored antenna 301 having sectors 301-0 to 301-7. Though an eight-sectored antenna 301 is described, the antenna 301 may comprise fewer or more sectors than eight. Though a sectored antenna 301 is described, other antenna configurations may be used, including but not limited to an omni-directional antenna, a collection of individually pointed directional antennas, a combination of a sectored antenna an omni-directional antenna, or a wired link. In any event the node 300 is part of the mesh network 100. However, in FIG. 3 the antenna 301 is coupled to a multi-way switch 302 for selectively accessing a sector of the sectors 301-0 through 301-7. The sectors 301-0 through 301-7 may be arranged in banks, such that the multi-way switch 302 may be used to select a bank.

The multi-way switch 302 is coupled to a radio 304 transceiver that includes a receiver 320 and a transmitter 322. In an embodiment, the radio 304 may be implemented using a 5.8 GHz UNII band radio. However, other radios with other frequencies also may be used. The radio 304 is coupled to a controller 305 that controls the radio 304. The controller 305 can be a field programmable gate array, a microcontroller, a microprocessor, or the like. The controller 305 itself is coupled to a single board computer (SBC) 306 that controls the overall operation of the node 300. The SBC 306 includes a memory 307 for storing data 312 that can include a set of operating instructions and/or communication data that is to be sent along the mesh network 100. The SBC 306 is configured for routing traffic, and in this context may be considered a router.

The SBC 306 is coupled to an interface 309, which may be a WLAN card, an Ethernet card, or the like. If the node 300 is a mesh gateway, a backhaul communication device 308 is coupled to the SBC 306 via the interface 309. The specific backhaul communication device 308 that is used depends on the type of backhaul.

The node 300 includes a device or devices for accurately keeping time. For example, a Global Positioning System (GPS) card 310 and an antenna 311 may be used for time keeping. The GPS antenna 311 is coupled to the GPS card 310, which, in turn, is coupled to the controller 305 and to the SBC 306. The GPS system is highly useful in time keeping since all nodes 300, as well as all other nodes of a system, can be highly accurately synchronized in time. Alternate timekeeping systems are also well known and can be used. In any event accurate time synchronization of the nodes 300 is important to the illustrated embodiment mesh communication protocol.

Highlighting several features of the mesh network 100 may be helpful. First, nodes 300 communicate using a special Time Division Duplex (TDD) technique. In most TDD systems, each mesh node 300 is provided with a specific time to send and a specific time to receive data. However, the mesh network 100 uses a TDD technique in which a time frame, a basic time unit such as, for example, 1 second, is divided into many small time units, referred to as mini-slots. For example, a mini-slot might be 100 μseconds in duration. Furthermore, as is explained in more detail subsequently, it is only during specific mini-slots that data can be transmitted by a master node to a specific slave node, or polling can be initiated between a master node and a specific slave node that is associated with a specific mini-slot. To do so, the master node sends polling signals to the specific slave node during one of the specific slave node's associated mini-slot. Furthermore, the polling signals must include identification information that identifies the specific slave node. Thus, accurate timing and polling signal composition is required to initiate polling.

FIG. 4 schematically illustrates a mesh communication topology that is in accord with the present invention. As illustrated, that topology includes master nodes 202A and 202B. The master node 202A has slave nodes 204A, 204C and 204E, while the master node 202B has slave nodes 204E, 204F, 204H, 204J, and 204I. Thus, every node that directly communicates with a master node is a slave node of that master node. The master nodes and their slave nodes have been predetermined, possibly by using a configuration protocol, or possibly by a fixed design. Furthermore, some slave nodes have their own slave nodes. A particular slave node becomes a slave of another slave node when that particular slave node communicates with a master node through that other slave node. For example, slave node 204C might have slave nodes 204B, 204D, and/or 204G.

It should be understood that the communication path from each slave node to at least one master node has been predetermined, again, possibly by a configuration protocol or by a fixed design. For example, slave node 204G might communicate with master node 202A via numerous paths, including though slave node 204C or via slave nodes 204F-204E. Alternatively slave node 204G might communicate with master node 202B via slave node 204F. However, it will be assumed that slave nodes 204B and 204D are slaves of slave node 204C, while slave node 204G does not communicate through slave node 204C (and thus slave node 204G is not a slave of slave node 204C).

Figure 5:
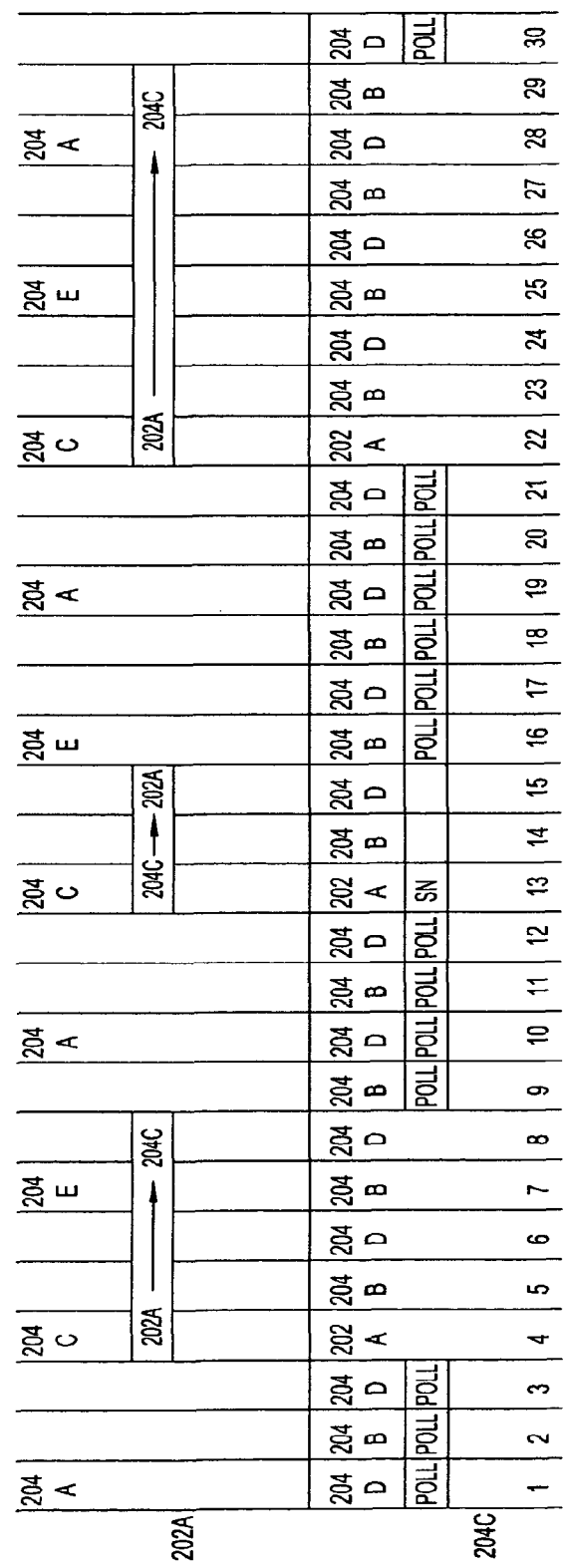

FIG. 5 schematically illustrates the communication protocol timing of the master node 202A and of the slave node 204C. As previously noted, each node 300 implements a time keeping function that divides a time frame, which may be 1 second, into a plurality of smaller time durations that are referred to as mini-slots. The mini-slots in each node 300 are associated with communication events with other nodes. Those communication times and events are stored in each node 300. While each node 300 will have a unique set of communication events, the nodes 300 that communicate with each other have matched mini-slots and communication events that enable communications. For example, the top half of FIG. 5 shows the mini-slots and their associated communication events for the master node 202A, while the bottom half shows the mini-slots and their associated communication events for slave node 204A. The individual mini-slots are consecutively numbered for convenience.

In mini-slot number 1, the master node 202A can, but need not, poll slave node 204A (see FIG. 4). As shown in FIG. 5 the master node 202A does not poll, nor send data to, slave node 204A, possibly because master node 202A has nothing to send to and does not want to receive anything from slave node 204A. However, during mini-slot number 1, the slave node 204C can and does poll slave node 204D. However, it should be understood that slave node 204C informs slave node 204D that all data transfers must be over or suspended by mini-slot 4, which is the mini-slot reserved for communication between master node 202A and slave node 204C. Thus, a primary rule of the inventive communication protocol is that a slave node MUST listen at the scheduled time for a transmission from its master node.

During mini-slots 2 and 3, the master node 202A has no scheduled communication events, while the slave node 202C polls information from slave nodes 204B and 204D.

During mini-slot 4, which is associated within the master node 202A with the slave node 204C and within the slave node 202C with the master node 202A, the master node 202A sends a data packet. The slave node 204C receives the packet information during mini-slot 4, decodes the data packet to ensure that it is the intend recipient. Then, during mini-slots 4 through 8 the master node 202A sends data to the slave node 204C.

As shown in FIG. 5, the master node 202A associates mini-slot 7 with slave node 204E. However, the master node 202A simply continues sending information to slave node 204C during mini-slot 7. Slave node 204E listens to the master node 202A during mini-slot 7, but not detecting identifying information meant for it; the slave node 204E goes back to dealing with its slave nodes, or simply waits for the next mini-slot associated with its polling period (mini-slot 19). Thus, another primary rule of the inventive communication protocol is that a master node may elect NOT to transmit to one of its slave nodes. Thus each slave node must listen to its master node during mini-slots associated with that master node, but a master node does not have to communicate with a slave node during those associated mini-slots. Furthermore, a master node can continue communicating with a slave node during mini-slots associated other slave nodes because the master node does not send out identifying information during those mini-slots.

Still referring to mini-slots 4-8, the slave node 204C internally associates those mini-slots with its own slave nodes 204B and 204D. However, since the slave node 204C is receiving information from its master node 202A the slave node 204C ignores its slave nodes. Thus, another primary rule of the inventive communication protocol is that a slave node does not ignore its master node, but may ignore its slave nodes.

During mini-slots 9-12 the slave node 204C polls data with its slave nodes 204B and 204D, while the master node 202A does nothing. However, in mini-slot 13, the master node 202A polls slave node 204C, which acknowledges the poll and signals the master node 202A that the slave node 204C wants to send data. In response, the master node 202A signals that it will accept data and then receives that data during mini-slots 13-15.

The foregoing process repeats during mini-slots 16-30. It should be understood that, while not specifically shown, that master node 202A can also poll its other slaves (slave nodes 204A and 204E) in their associated mini-slots.

Figure 6:
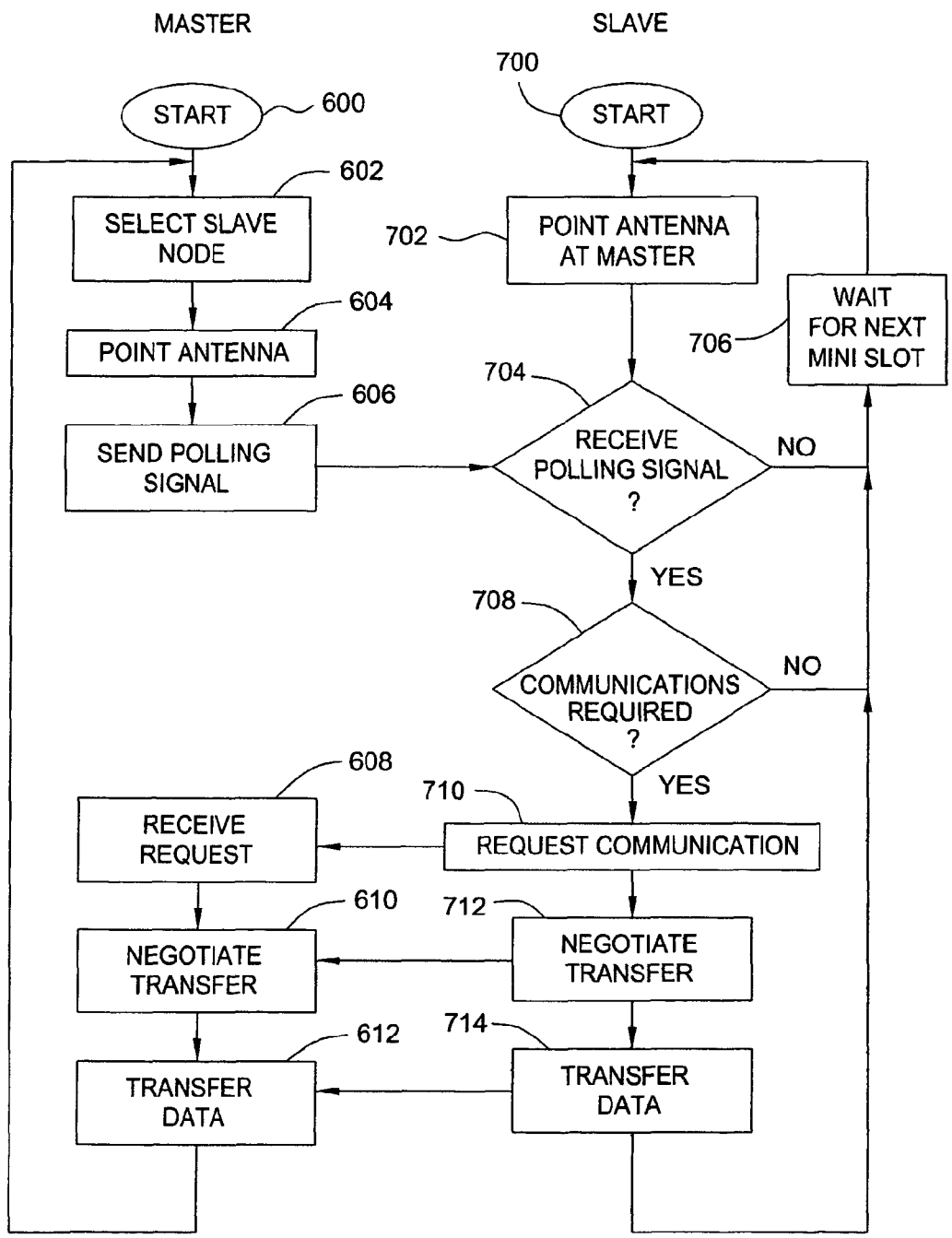
FIG. 6 illustrates a flow diagram of a mesh communication protocol.

A flow diagram of a mesh communication protocol is provided in FIG. 6. A master node starts at step 600 by identifying its assigned mini-slots. Likewise, a slave node starts at step 700 by identifying its assigned mini-slots. At step 602 the master node selects a slave node to be polled and waits for a mini-slot associated with that selected node. Then, at step 604 the master directs its antenna to point toward the selected slave node, and at step 606, during a mini-slot associated with the selected slave node, the master node transmits polling information to the selected slave node.

Meanwhile, at step 702 the selected slave node points its antenna toward the master node during an assigned mini-slot associated with the master node, and at step 704 the selected slave node begins receiving the polling information from the master node. If the selected slave node does not find its identifying information or a polling signal, at step 706 the selected slave node waits for its next associated mini-slot with the master node. While waiting the selected slave node can perform other tasks, such as communicating with its own slave nodes.

However, if at step 704 the selected slave node finds its identifying information or polling signal, at step 708 that slave node decides if communication is required. If not, the selected slave node waits at step 706 for its next associated mini-slot with the master node. However, if the slave node decides that communication is required, at step 710 the slave node requests communications with the master node.

In response to the selected slave node's request, at step 608 the master node receives the selected slave node's request and then at step 610 the master node, and at step 712 the selected slave node, negotiate data transfer. Then, at step 612 the master node, and at step 714 the selected slave node, perform the negotiated data transfer. The master node then loops back to step 602 to select another slave node to communicate with. Furthermore, the selected slave node loops to step 706 where the selected slave node waits for the next associated mini-slot with the master node.

It should be understood that mini-slot timing and communication events are shared between nodes that communicate with each other. The mesh communication protocol is such that if a mini-slot reserved for a particular node occurs when no data is to be sent or received by that node or if information is still being sent to another node, than the mini-slot communication event is ignored. Data is then stored until the next associated mini-slot occurs. Furthermore, data transfer is improved somewhat by making the mini-slots as narrow as possible. This improves the granularity of the protocol, enabling another communication event to occur with minimal delay.

In the mesh network 100, if the data transfer time with a master node exceeds the mini-slot time, data transfer can continue either until the data transfer is complete or until an agreed amount of data is transferred. The master node can than selectively poll another slave node in that slave node's next assigned mini-slot, and eventually come back to pick up the remainder of any data that has not been transferred. However, if the data transfer time with a slave node exceeds the mini-slot time assigned to a master node, that slave node must stop the data transfer and listen to the master node.

There are many ways for a master node to send identifying information to a slave node to inform that slave node that it is being polled. As a preliminary matter, in a wireless mesh network the master antenna needs to point toward a slave node. Then, a slave node can point its antenna toward the master and look for the start of an information packet having header data that identifies the slave node. If that header data is not found, the slave node can then determine that any data being sent is not meant for it. Alternatively, a slave node can simply look for the start of a message during its associated mini-slots. The start of a message could be detected by a received signal that jumps from no energy to energy. If the start of a message is not found that slave node would know that any ongoing message is not for it.

While the foregoing is directed to embodiments of the present invention, other and further embodiments of the invention may be devised without departing from the basic scope thereof, and the scope thereof is determined by the claims that follow

The invention claimed is:

1. A mesh network, comprising:
   a plurality of network nodes for establishing a plurality of time-slots in a time frame and associating every time-slot with communications between a pair of nodes, wherein at least one time-slot is associated with communications between a first node and a second node, and wherein a second time-slot is associated with communications between the first node and a third node, wherein the first node and the second node communicate during at least one time-slot, wherein the third node awaits communications with the first node in the second time-slot, wherein the first node does not communicate with the third node in the second time-slot if the first node continues to communicate with the second node beyond a time period defined by the at least one time slot, wherein while the third node awaits communications with the first node the third node receives signals from other nodes and wherein while the third node awaits communications with the first node the third node directs an antenna toward the first node.

2. The network according to claim 1, wherein the plurality of network nodes comprises neighborhood access points coupled to a backhaul.

3. The network according to claim 1, wherein at least one of the first node, the second node and the third node comprises:
   a transceiver for sending and receiving signals within a mesh network;
   an antenna comprising a plurality of antenna arrays, where each of the plurality of antenna arrays comprises a plurality of sectors; and
   a switching means for (i) selecting an antenna array from the plurality of antenna arrays; (ii) selecting, within the selected antenna array, at least one sector corresponding to a location of a given network node of the mesh network, wherein the location is known by the network node; and (iii) coupling the transceiver to the selected at least one sector.

4. The network according to claim 1, wherein the first node communicates with the third node in the second time-slot if the first node has completed communicating with the second node.

5. The network according to claim 1, wherein the first node and the second node communicate includes having the first node send polling information during the at least one time-slot.

6. The network according to claim 5, wherein the first node sends an identification signal to the second node.

7. The network according to claim 1, wherein the first node transmits data to the second node during the at least one time-slot.

8. The network according to claim 1, wherein the first node receives data from the second node during the at least one time-slot.

9. The network according to claim 1, wherein the plurality of nodes synchronize the time.

10. The network according to claim 1, wherein the first node and the second node establish wireless communications during the at least one time-slot.

11. A network for providing a mesh communication protocol comprising:
    a master node;
    a first slave node coupled to the master node, wherein the master node polls the first slave node during a first time-slot of a plurality of first time-slots by sending a slave identification signal to the first slave node, wherein the first slave node listens to the master node during each time-slot of the plurality of first time-slots, wherein the first slave node responds after identifying its slave identification signal; and
    a second slave node coupled to the master node and the first slave node, wherein the second slave node listens to the master node during each time-slot of a plurality of second time-slots; wherein the second slave node does not respond to the master node if the second slave node does not identify a slave identification signal meant for the second slave node during the plurality of second time slots, wherein the first slave node and the master node exchange information during polling, wherein the second slave node is allowed to communicate with its own slave node during a first time-slot.

12. A mesh network for inter-nodal communications, comprising:
a plurality of nodes for establishing a plurality of first time slots and a plurality of second time slots in each time frame of a sequence of time frames, wherein the plurality of nodes comprises:
a node acting as a master node by sending first polling information that includes a first slave identification signal during a first time slot of the plurality of first time slots;
another node acting as a first slave node by receiving the first polling information during the first time slot, wherein the first slave node responds to the first polling information after identifying the first slave identification signal; and
yet another node acting as a second slave node by receiving second polling information during the plurality of second time slots, wherein the second slave node does not respond to the master node if a second slave identification signal is not identified, wherein the second slave node communicates with still yet another node during the first time slot.

13. The network according to claim 12, wherein the master node and the first slave node negotiate a transfer of data during the first time slot.

14. The network according to claim 13, wherein the master node and the first slave node perform the negotiated transfer of data.

15. The network according to claim 12, wherein the master node points an antenna toward the first slave node during the first time slot.

16. The network according to claim 12, wherein the master node receives data from the first slave node during at least a first mini-slot of the plurality of first time slots.

* * * * *